United States Patent
Ernst

(10) Patent No.: US 11,034,160 B2
(45) Date of Patent: Jun. 15, 2021

(54) METHOD FOR PRINTING ON THE SURFACE OF AN OBJECT

(71) Applicant: HEIDELBERGER DRUCKMASCHINEN AG, Heidelberg (DE)

(72) Inventor: Uwe Ernst, Mannheim (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 92 days.

(21) Appl. No.: 16/359,493

(22) Filed: Mar. 20, 2019

(65) Prior Publication Data
US 2019/0299654 A1 Oct. 3, 2019

(30) Foreign Application Priority Data

Mar. 28, 2018 (EP) .................................... 18164503

(51) Int. Cl.
*B41J 2/21* (2006.01)
*B41J 2/045* (2006.01)
(Continued)

(52) U.S. Cl.
CPC ......... *B41J 2/2135* (2013.01); *B41J 2/04508* (2013.01); *B41J 2/04586* (2013.01);
(Continued)

(58) Field of Classification Search
CPC ...... B41J 2/2135; B41J 2/2132; B41J 11/002; B41J 2/04508; B41J 2/04586;
(Continued)

(56) References Cited

U.S. PATENT DOCUMENTS

| 6,357,847 B1 | 3/2002 | Ellson et al. |
| 7,857,412 B2 | 12/2010 | Wada et al. |
| (Continued) |

FOREIGN PATENT DOCUMENTS

| CN | 1623779 A | 6/2005 |
| CN | 101954787 A | 1/2011 |
| (Continued) |

OTHER PUBLICATIONS

Thorp, Debbie, Analysing, Understanding, & Improving Image Quality, IMI Inkjet printing Conference, Feb. 2015, pp. 26 and 27, Orlando, Florida, http://www.globalinkjetsystems.com.

*Primary Examiner* — Henok D Legesse
(74) *Attorney, Agent, or Firm* — Laurence A. Greenberg; Werner H. Stemer; Ralph E. Locher

(57) ABSTRACT

A method for printing on the surface of an object uses a print head generating ink drops to print at least a first swath and subsequently a second swath of ink onto the surface in such a way that the swaths are mutually adjacent and overlap in a strip. The first and second swaths are printed as solid areas and the swaths are XY stitched in the strip. In the strip, at least one of the two swaths is additionally stitched by using a function of an ink amount profile in a Y direction. High-quality or even highest-quality printed products can therefore be produced, in particular avoiding defects that are visible to the human eye in a region of overlap or a strip between swaths that are printed next to one another.

12 Claims, 4 Drawing Sheets

(51) Int. Cl.
*B41J 3/407* (2006.01)
*B41J 11/00* (2006.01)
*B41J 25/00* (2006.01)

(52) U.S. Cl.
CPC .......... *B41J 2/2132* (2013.01); *B41J 3/4073* (2013.01); *B41J 11/002* (2013.01); *B41J 25/005* (2013.01)

(58) Field of Classification Search
CPC ........ B41J 3/4073; B41J 25/005; B41J 3/407; B41J 25/304; B41J 2/01; G06K 15/107
See application file for complete search history.

(56) References Cited

U.S. PATENT DOCUMENTS

| | | |
|---|---|---|
| 8,167,404 B2 | 5/2012 | Mantell et al. |
| 9,266,353 B2 | 2/2016 | Beier et al. |
| 2003/0132979 A1 | 7/2003 | Taylor |
| 2006/0170730 A1 | 8/2006 | Rogers |
| 2010/0007898 A1* | 1/2010 | Bane .................. G06K 15/107 358/1.4 |
| 2015/0097906 A1* | 4/2015 | Beier .................. B41M 5/0017 347/103 |

FOREIGN PATENT DOCUMENTS

| | | |
|---|---|---|
| CN | 104203584 A | 12/2014 |
| EP | 1217578 A2 | 6/2002 |
| EP | 1671800 A2 | 6/2006 |
| EP | 2875953 A1 | 5/2015 |
| JP | 2007230090 A | 9/2007 |
| WO | 2008040968 A1 | 4/2008 |

\* cited by examiner

METHOD FOR PRINTING ON THE SURFACE OF AN OBJECT

CROSS-REFERENCE TO RELATED APPLICATION

This application claims the priority, under 35 U.S.C. § 119, of European Patent Application 18 164 503.7, filed Mar. 28, 2018; the prior application is herewith incorporated by reference in its entirety.

BACKGROUND OF THE INVENTION

Field of the Invention

The present invention relates to a method for printing on the surface of an object, in which a print head generating ink drops prints at least two swaths of ink onto the surface in such a way that the swaths are mutually adjacent and overlap in a strip, i.e. a first swath and subsequently a second swath. The first and second swaths are printed as solid areas and the swaths are XY stitched in the strip.

The technical field of the invention is the field of the graphic industry, in particular the field of industrial inkjet printing onto three-dimensional objects, i.e. the application (and curing or drying) of liquid ink to surfaces of any desired shape, preferably made of plastic or metal.

Description of the Related Art

In the known DOD (drop on demand) inkjet printing processes, a print is created on the surface of an object of any desired shape, e.g. a curved shape, by an inkjet print head (abbreviated: head) that includes individually actuatable nozzles for generating tiny ink drops, preferably in a picoliter range, in accordance with the image to be printed and transferring them to the surface without contact. The nozzles may be actuated by piezoelectric actuators. In that process, a printed swath is created on the surface. A number of such swaths may be located next to one another, i.e. adjoin one another, to cover a print area. In order to obtain a relative movement between the head and the surface, the head and/or the object may be moved or rotated. For that purpose, a respective robot arm having a number of prismatic joints and/or rotary joints may be used.

There may be a so-called "hard" seam between the swaths that are printed next to one another by one print head, i.e. there is no overlap between two adjacent swaths. In most cases, such a seam is visible to the naked eye and is therefore undesirable, in particular in printed solid areas. Therefore, a so-called "soft" seam is preferred, which means that the two swaths are "stitched" together in the Y direction or transverse direction of the swath, i.e. perpendicular to the X direction or longitudinal direction of the swath. The stitching may occur in a location-dependent way, i.e. every print dot in the region of overlap of the two swaths is assigned to one swath or to the other and printed accordingly when the print head prints the one or the other swath. In this process, a comb-like distribution or a random distribution may be chosen in the Y direction (Y stitching). In addition, stitching may be implemented in the X direction too, (X stitching), for instance likewise based on a random distribution. If stitching is done simultaneously in both directions, the process is referred to as XY stitching.

European Patent Application EP 12 17 578 A2, corresponding to U.S. Pat. No. 6,357,847, discloses a method and a device for image processing. Multiple print heads disposed behind one another are guided over a substrate in the X direction to print a swath. Then the substrate is moved on in the Y direction. Another swath is printed while XY stitching takes place.

Pages 26 and 27 of the presentation entitled "Analysing, Understanding, & Improving Image Quality" which was given by Debbie Thorp, Business Development Director, at the IMI Inkjet printing Conference in Orlando, Fla. in February 2015 and is publicly accessible online at http://www.globalinkjetsystems.com, also deals with the subject of XY stitching.

European Patent Application EP 16 71 800 A2, corresponding to U.S. Publication No. 2006/0170730, discloses a print head system for minimizing the so-called stitching error. In the system, two print heads which are disposed to be stationary are used and every head prints its own swath. In the region of overlap of the two swaths, XY stitching is applied. In addition, the amount of ink at the location of a print dot is stitched too, i.e. the print dots in the region of overlap are composed of ink from both swaths. In that context, a random distribution may be chosen to avoid visible defects.

Despite the measures taken in the region of overlap, visible defects may still be created. In particular, the print may have a mottled appearance and the quality of the print that is created may suffer.

SUMMARY OF THE INVENTION

It is accordingly an object of the invention to provide an improved method for printing on the surface of an object, which overcomes the hereinafore-mentioned disadvantages of the heretofore-known methods of this general type which, in particular, provides a way to produce printed products of higher or highest quality and which, in particular, avoids defects that are visible to the human eye in a region of overlap or a strip where swaths are printed next to one another.

With the foregoing and other objects in view there is provided, in accordance with the invention, a method for printing on the surface of an object, in which a print head generating ink drops prints at least two swaths of ink onto the surface in such a way that the swaths are adjacent one another and overlap in a strip, i.e. a first swath and subsequently a second swath, the first and second swaths are printed as solid areas, the swaths are XY stitched in the strip (ink location stitching), and in the strip, at least one of the two swaths is additionally stitched by using a function of an ink amount profile in the Y direction.

The invention advantageously provides a way to produce high-quality or even highest-quality printed products, in particular printed objects and bodies, in particular avoiding defects that are visible to the human eye in a region of overlap or strip between swaths that are printed next to one another.

Instead of one print head, more than one print head are used, for instance four print heads for the CMYK colors. The one print head or each one of multiple print heads may include a row of nozzles or multiple rows of nozzles.

The swaths may be straight or curved and they may, for instance, have multiple curves in various directions.

A solid area is created when the ink drops applied to the object by the head or rather the pixels (or rather the print dots formed by the pixels) formed on the surface by the drops coalesce to form a substantially continuous layer or film of ink. The solid area may be created by using colored ink, opaque white, a precoat, or a varnish. Special color inks may also be applied.

The step of additionally stitching at least one of the two swaths in the strip by using a function for the ink amount profile in the Y direction, may be referred to as gray value stitching or ink amount stitching.

An advantage of the invention is that by combining the XY stitching and the function-based gray value stitching, even tiny defects that are only just discernible by the human eye in the region of overlap or strip of swaths printed next to one another may be avoided. Thus, the printed image has a correspondingly smooth appearance. The invention thus uses a different approach than the prior art that attempts to increase print quality merely by continuously improving the XY stitching methods. Moreover, the invention also uses a different approach than the prior art that attempts to mask undesired effects by using random patterns in gray value stitching as a way to improve print quality. The successful way of using function-based gray value stitching in addition to the known XY stitching was found in extensive tests in the course of the quest for a solution. Function-based in this context is understood to mean that no random distribution is chosen for gray value stitching. Instead, a function-based profile is chosen, preferably a continuous profile, in particular a continuous decrease towards the adjacent swath. This is the only way to create prints that have a satisfactorily smooth appearance.

The XY stitching process may be as follows: Based on a location-dependent random factor, a pixel (print dot) in the overlapping strip is assigned to the first swath or to the second swath. An aspect that is factored in in this process is that a pixel is more likely to be assigned to the first swath if it is closer on the side of the first swath and less likely if it is closer on the side of the second swath. Conversely, a pixel is more likely to be assigned to the second swath if it is closer on the side of the second swath and less likely if it is closer on the side of the first swath. In this context, "closer to a swath" is understood for instance to refer to the distance to the center of the respective swath. This ensures that in the transitional region (strip) between the first and second swaths, the number of pixels of the first swath continuously decreases from the first swath to the second swath and conversely, the number of pixels that are assigned to the second swath continuously increases from the first swath to the second swath.

The location-dependent random factor f may preferably be calculated as follows:

$$f = ((\text{distance } A \text{ to second swath})\hat{}x / ((\text{distance } A \text{ to second swath})\hat{}x + (\text{distance } A \text{ to first swath})\hat{}x))$$

while the following applies:
distance A is the Y position in the strip (e.g. values from 0 to 249, with swath 1=position 0 and swath 2=position 249); and
x is the power or order h (values form 0 to 20).

In order to be able to divide the image to be printed (in swaths) in accordance with the XY stitching pattern, the first step preferably is to complete the separation of the entire image into the individual color separations in a digital RIP process. In order to facilitate the coalescence of ink from both swaths, it is expedient and thus preferred for the first swath to undergo only partial pinning for instance by guiding a radiation source over the surface of the swath in a transversely offset configuration relative to the swath. The pinning of the region of overlap is not completed until the second swath undergoes the pinning process.

In accordance with the gray value stitching process of the invention, a pattern in the form of a Gaussian bell curve is calculated. For the threshold S, the following applies:

$$S = e\hat{}((\text{factor } F * (Y \text{ position} - \text{center } M))\hat{}2)$$

This is a way to generate distributions having a width and a center which are adjustable through the variables of "factor F" and "center M."

Now it is advantageously possible to combine the XY stitching that has previously been calculated and the gray value bell curve: if no gray value stitching is to be implemented in a position, the entire pixel may be printed as envisaged by the XY stitching process (swath 1 or swath 2). If gray value stitching is to be implemented in a position, a gray value for swath 1 and a gray value for swath 2 may be defined, depending on whether the pixel is to be written in swath 1 or swath 2.

The distributions of swath 1 and swath 2 may, for instance, be selected for a factor F=−0.0004 (a wide bell curve), a center=110 (slightly off-center with center at 125 pixels) and a power h=20 (generating a narrow XY stitching region).

Another preferred development of the invention may be that in the strip, the first swath is exclusively XY stitched and the second swath is both XY stitched and additionally stitched by using the predefined function for the ink-amount profile in the Y direction. This process may be referred to as "asymmetric." In extensive testing it has been found that such an asymmetric process yields particularly good results in terms of the print quality that may be attained. The function for the ink amount profile in the Y direction is preferably such that in the strip, the amount of ink printed in the second swath decreases in the Y direction towards the first swath at a gradient. In accordance with a particularly preferred feature, the predefined function is a Gaussian bell curve or only one half of such a curve, i.e. only a flank of the curve that decreases from the center. Alternatively, the flank of a sine curve may be used. However, care should be taken to ensure continuous transitions.

A further preferred development of the method of the invention may be that in the strip, ink drops in the second swath are printed in such a way that locations that are not to be printed in the second swath in accordance with the XY stitching process are nevertheless stitched and printed by using the predefined function for the ink amount profile in the Y direction. Thus, in the second swath, ink drops are printed in locations that have already received a maximum-size ink drop in the first swath. This way to proceed may preferably be combined with the asymmetrical process. Extensive tests have found such a combination to be particularly advantageous.

An added preferred development of the invention may be that a width of the function along the two swaths is varied. For instance, a Gaussian bell curve (or only a flank thereof) may be varied in terms of its width, e.g. in the longitudinal direction of the swath, either in a random or in a periodic way.

An additional preferred development of the invention may be that the type of the function is varied along the two swaths.

Another preferred development of the invention may be that the varying of the type of the function is achieved by switching between curves of different orders, in particular between a curve of the second order and at least one curve of a higher order. For instance, a Gaussian bell curve (or only a flank thereof) may be exchanged for another function, e.g. a curve of a higher order, e.g. in the longitudinal direction of the swath and in a random or periodic way.

A further preferred development of the invention may be that the width of the strip is varied along the two swaths. In heavily curved surface areas of the object, a smaller width (e.g. only 50%) may preferably be defined than in less heavily curved or flat areas.

An added preferred development of the invention may be that the varying is achieved by using a predefined further function for the width profile of the strip, in particular by using a sine-shaped function.

An additional preferred development of the invention may be that the function and/or the further function is/are selected as a function of the material or the structure of the surface or of the material or the structure of a coating of the surface. For instance, different functions may be selected for absorbent object surfaces and for non-absorbent object surfaces.

A concomitant preferred development of the invention may be that the two swaths are pinned by using a radiation source and/or a heat source, i.e. the ink is partially cured and/or partially dried. The source may be a UV source or an IR source.

The features of the invention, of the further developments of the invention, and of the exemplary embodiments of the invention may be combined with one another to create advantageous further developments of the invention. In addition, further developments of the invention may include the individual features or combinations of features disclosed in the above section entitled "Field of the Invention."

Other features which are considered as characteristic for the invention are set forth in the appended claims.

Although the invention is illustrated and described herein as embodied in a method for printing on the surface of an object, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
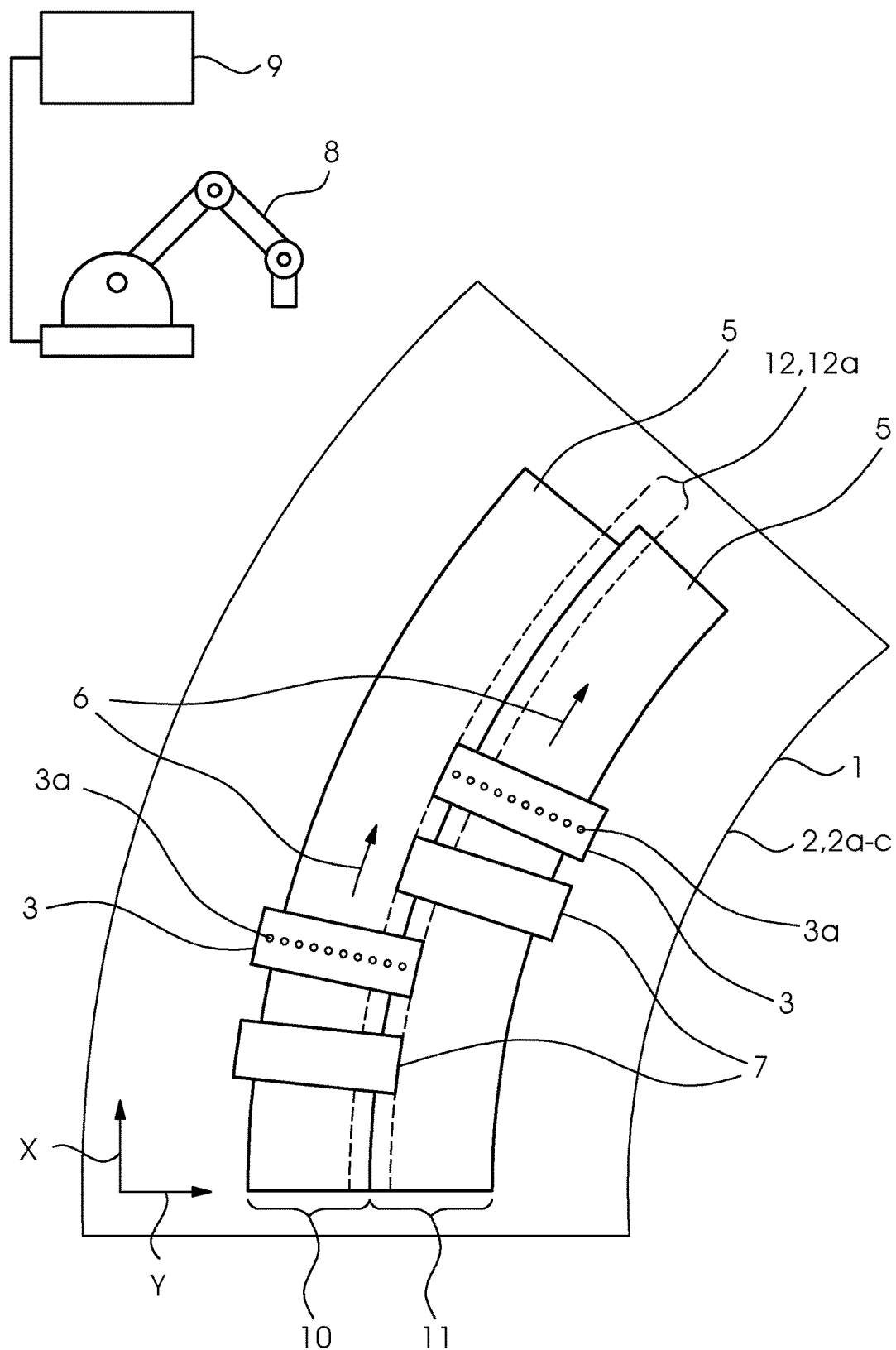
FIG. 1 is a diagrammatic, top-plan view of a device for implementing the method.

Referring now in detail to the figures of the drawings, in which corresponding features have the same reference symbols, and first, particularly, to FIG. 1 thereof, there is seen a top view of a device for implementing a preferred exemplary embodiment of the method of the invention.

FIG. 1 illustrates an object 1, e.g. a 3D body, with its curved surface 2 (which is curved in one spatial direction or preferably in two spatial directions). This surface may have a coating 2a. The surface or surface coating is formed of a material 2b such as plastic or metal and may potentially have a surface structure 2c, i.e. a rough surface structure.

Figure 2A:
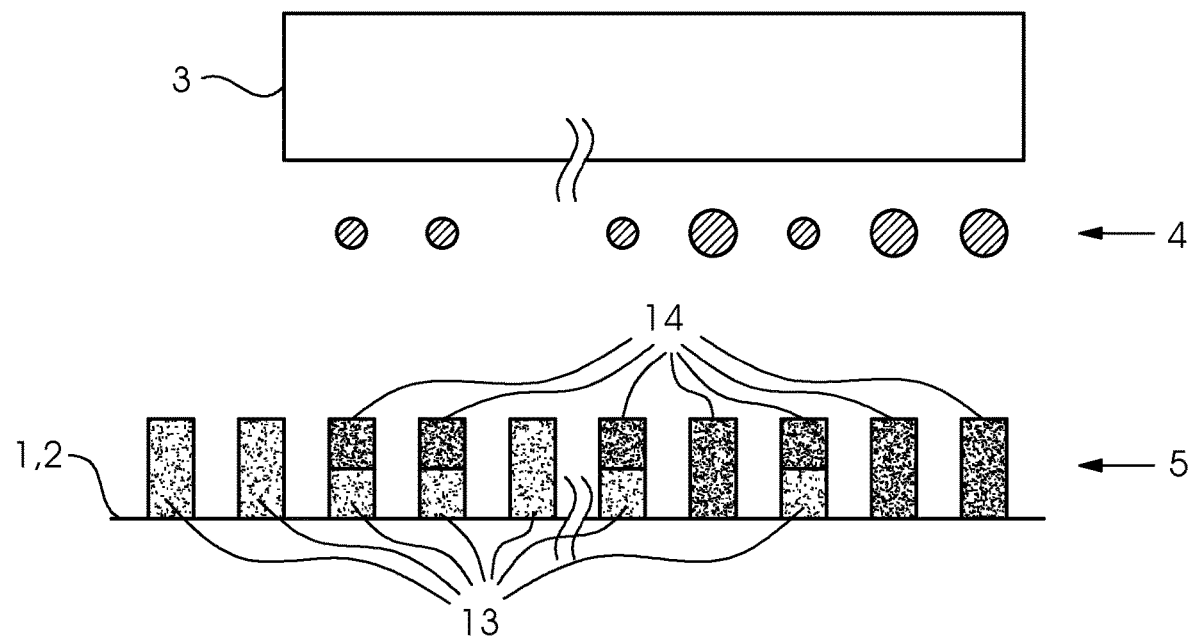
FIG. 2A is a side-elevational view of an overlapping strip.
Figure 2B:
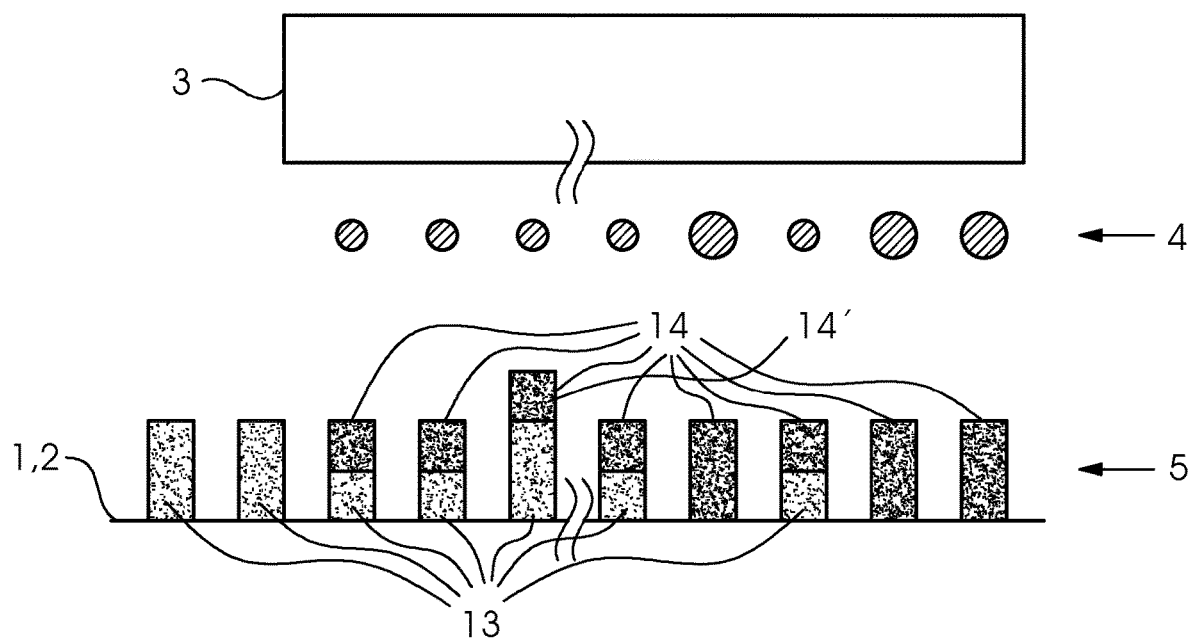
FIG. 2B is a side-elevational view of a further overlapping strip.

FIG. 1 further illustrates an ink print head 3 having a number of ink nozzles 3a for jetting ink drops 4 (see FIGS. 2A and 2B). Liquid ink 5 is applied to the surface 2 by the ink drops 4. The ink drops 4 form corresponding print dots on the surface 2. The print dots coalesce to form a continuous inked surface, i.e. a solid area is printed.

FIG. 1 further shows that the print head 3 is moved across the surface 2 along a direction 6. In this process, the print head first prints a first swath 10 and subsequently a second swath 11 next to the first swath. Reference symbol X indicates the longitudinal direction of the two swaths 10, 11 and reference symbol Y is perpendicular thereto, i.e. the transverse direction.

FIG. 1 shows that the two swaths 10 and 11 overlap in a strip 12. The strip has a width 12a. The width of the strip may be 250 pixels (or less, e.g. 128 or 64 pixels). In accordance with the invention, this region of the strip is where stitching is implemented, i.e. the print head 3 prints the print dots 5 in the strip in the first swath 10 or in the second swath 11. Individual print dots may be printed in both swaths. This will be described in more detail with reference to FIGS. 2A and 2B.

FIG. 1 further illustrates a robot arm 8 for guiding the print head 3 across the surface 2. The robot arm 8 is controlled by a control unit 9. The control unit 9 may also actuate the print head 3 based on the data to be printed. In addition, a radiation source 7 or a heat source 7 may be moved along the two swaths 10, 11 by using the robot arm 8. The sources may partially cure or dry the ink 4 applied in the swaths, in a process also known as "pinning."

FIG. 2A is a diagrammatic side view of an overlapping strip 12 printed in accordance with a preferred exemplary embodiment of the method of the invention.

FIG. 2A again illustrates the print head 3 that applies ink drops 4 to the object 1, i.e. to the surface 2 thereof. The applied ink drops are illustrated as print dots/ink 5 on the surface of the object. The height of the illustrated columns corresponds to the applied amount of ink. In fact, the ink drops do not form columns on the surface but rather dome-like structures that coalesce or merge with one another, thus forming a solid area and a substantially continuous ink film. In this respect, the illustrated columns are to be understood as illustrative of the locations in which ink is applied and of the amounts of ink applied in the respective locations.

FIG. 2A indicates that in specific locations, ink 13 has been applied that stems from print dots in the first swath 10. This means that this ink 13 was applied when the print head 3 was moved along the first swath 10. FIG. 2A also shows ink 14 that was applied in the second swath 11. This means that this ink 14 was applied when the print head 3 was moved along the second swath 11. In some locations, only ink 13 of the first swath has been applied. In some locations, only ink 14 of the second swath has been applied. However, there are locations in which ink 13 and 14 was applied. This means that in these locations, the print head 3 applies ink both in the first swath 10 and in the second swath 11.

Thus, FIG. 2A shows that the stitching operation between the first swath 10 and the second swath 11 is both an XY stitching operation and additionally a stitching operation for the ink amount profile in the Y direction (profile transverse to the longitudinal direction of the swaths 10, 11 or of the strip 12). This ink amount profile (from the left to the right in FIG. 2, for example) is not a random profile but corresponds to a predefined function 15 (see FIG. 3). FIG. 2A also shows that the ink drops 4 may be of different sizes. The application of ink drops of different ink volumes is a way to specifically control the amount of ink applied to every location in accordance with the predefined function. For instance, it is possible to vary the amount of ink in accordance with a Gaussian bell curve in a direction transverse to the strip 12, along the width 12a of the strip.

A print head 3 capable of printing ink drops in seven different sizes may preferably print size four drops in the first swath and size five drops in the second swath. Tests have found that very good results are produced in this way.

FIG. 2B is a diagrammatic view of a further overlapping strip 12 printed in accordance with a further preferred exemplary embodiment of the method of the invention.

FIG. 2B again shows the print head 3 applying ink 5 to the object 1, i.e. to the surface thereof. Again, like in FIG. 2A, ink columns are shown that are intended to diagrammatically represent the locations and amounts of the applied ink.

In a way corresponding to the embodiment shown in FIG. 2A, the embodiment of FIG. 2B likewise involves both XY stitching and stitching using an ink amount profile in the Y direction and based on a predefined function 15. An additional aspect shown in FIG. 2B is, however, that at a sample print dot 14', ink 13 was applied when the first swath 10 was printed and ink 14 was applied when the second swath 11 was printed, although 100% of the ink amount had already been applied when the first swath 10 was printed. Thus, more than 100% of the ink amount is applied. Therefore, additional ink 14' is applied in the second swath 11.

Figure 3:
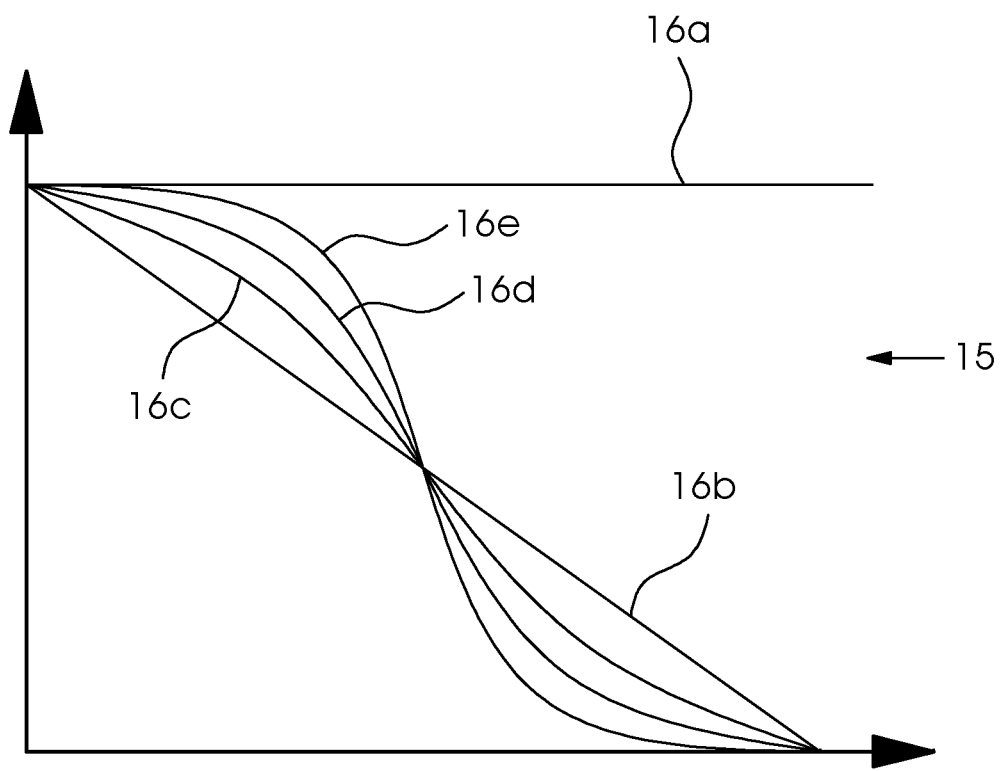
FIG. 3 is a diagram illustrating a function.

FIG. 3 illustrates a function/family of curves that is used in a preferred exemplary embodiment of the method of the invention.

FIG. 3 illustrates a function 15. In concrete terms, the function 15 is illustrated as a family of curves of the $n^{th}$ order. In this case, a curve 16a corresponds to the zero order, curve 16b to the first order, curve 16c to the second order (or Gaussian bell curve), curve 16d to the third order, and curve 16e to the fourth order. The abscissa corresponds to the Y-direction and indicates the region of the width 12a of the strip 12. The ordinate corresponds to the variable ink amount between 0 and 100%. A curve of the $n^{th}$ order may be predefined and chosen to implement the method of the invention. Preferably, a curve of the $2^{nd}$ order is selected. It is possible to choose two or more curves and to switch between these two curves during the printing operation, in particular between a curve of the 2nd order and a curve of the 3rd order.

Figure 4:
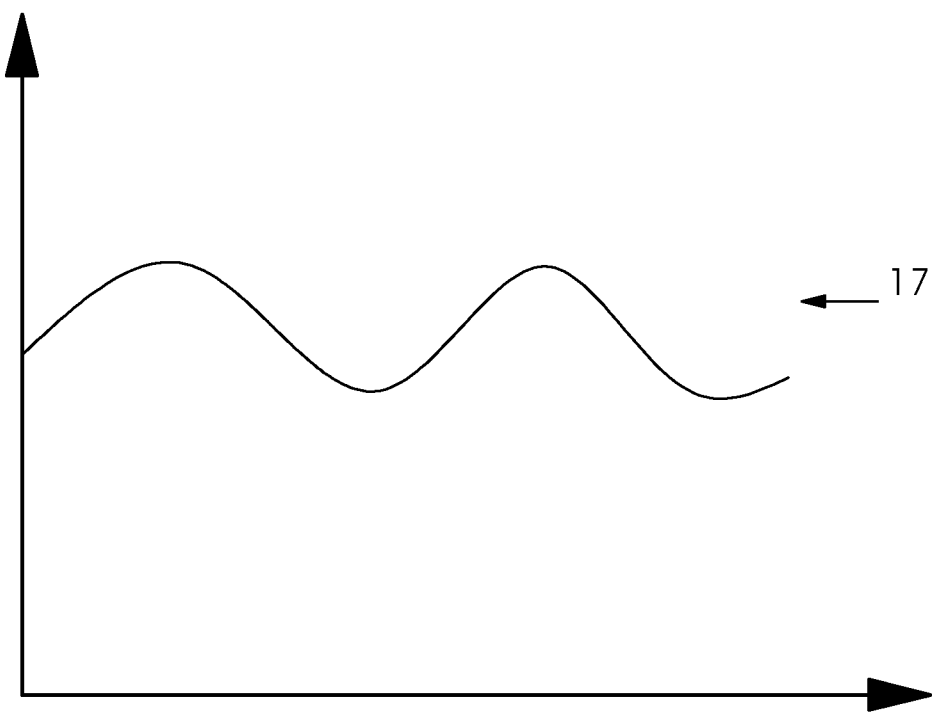
FIG. 4 is a diagram illustrating a further function.

FIG. 4 illustrates a further function that is used in a preferred exemplary embodiment of the method of the invention.

FIG. 4 illustrates that the further function 17 is preferably a sine-shaped function. This further function may be defined for the width profile of the strip 12. The abscissa corresponds to the X direction and indicates a region along the longitudinal direction of the strip 12. The ordinate corresponds to the variable width 12a of the strip 12. A maximum width 12a of preferably 250 pixels may be defined.

The following is a summary list of reference symbols and the corresponding structure used in the above description of the invention:
1 object
2 surface
2a surface coating
2b surface material
2c surface structure
3 print head
3a nozzles
4 ink drops
5 ink/print dots
6 directions
7 radiation source/heat source
8 robot arm
9 control unit
10 first swath
11 second swath
12 strip (of overlap)
12a width of the strip
13 ink/print dots in the first swath
14 ink/print dots in the second swath
14' ink/print dots in the second swath
16 function
16a-e curves of nth order
17 further function
X longitudinal direction of the swaths and strip
Y transverse direction of the swaths and strip

The invention claimed is:

1. A method for printing on a surface of an object, the method comprising the following steps:
using a print head to generate ink drops and to print onto the surface at least a first swath and subsequently a second swath of ink being mutually adjacent and overlapping in a strip, printing the first and second swaths as solid areas, and XY stitching the swaths in X and Y directions in the strip; and
additionally stitching at least one of the two swaths in the strip by using a predefined function for an ink amount profile in the Y direction.

2. The method according to claim 1, which further comprises, in the strip, exclusively XY stitching the first swath and both XY stitching and additionally stitching the second swath by using the predefined function for the ink amount profile in the Y direction.

3. The method according to claim 1, which further comprises, in the strip, printing the ink drops in the second swath in such a way that locations not to be printed in the second swath in accordance with the XY stitching are nevertheless stitched and printed by using the predefined function for the ink amount profile in the Y direction.

4. The method according to claim 1, which further comprises varying a width of the function along the first and second swaths.

5. The method according to claim 1, which further comprises varying a type of the function along the first and second swaths.

6. The method according to claim 5, which further comprises carrying out the step of varying the type of the function by shifting between curves of different orders.

7. The method according to claim 5, which further comprises carrying out the step of varying the type of the function by shifting between a curve of the second order and at least one curve of a higher order.

8. The method according to claim 1, which further comprises varying a width of the strip along the first and second swaths.

9. The method according to claim 8, which further comprises carrying out the varying step by using a predefined further function for a width profile of the strip.

10. The method according to claim 9, which further comprises selecting at least one of the function or the further function in dependence on a material or a structure of the surface or on a material or a structure of a coating on the surface.

11. The method according to claim 8, which further comprises carrying out the varying step by using a predefined sine-shaped further function for a width profile of the strip.

12. The method according to claim 1, which further comprises pinning the first and second swaths by using at least one of a radiation source or a heat source causing the ink to be at least one of partially cured or partially dried.

\* \* \* \* \*